United States Patent Office 3,345,960
Patented Oct. 10, 1967

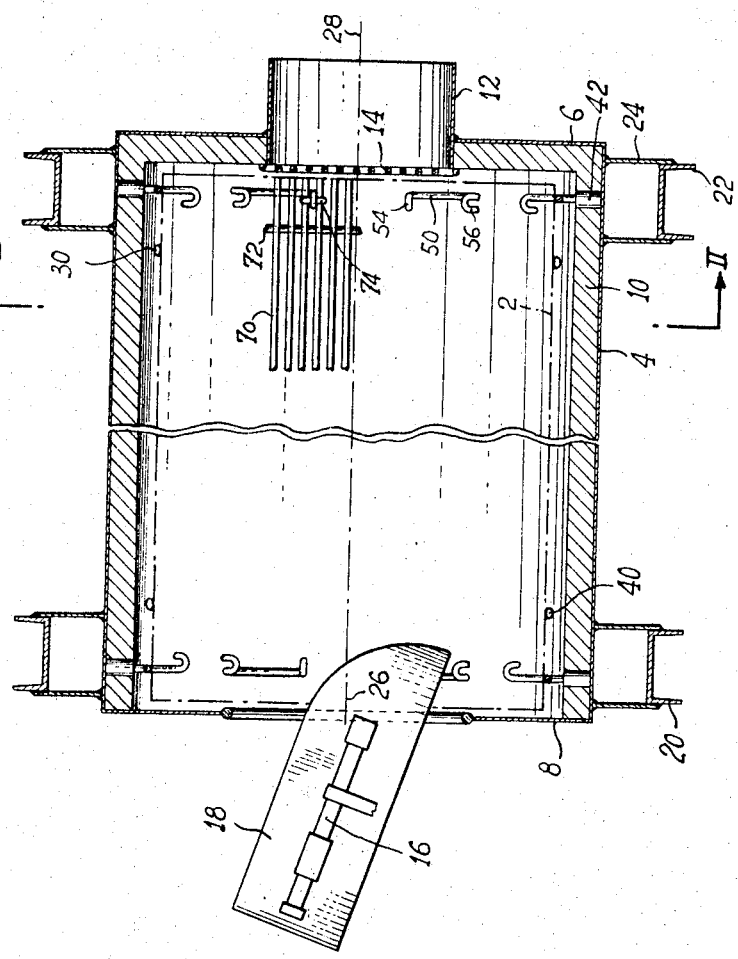

3,345,960
ORGANIC MATERIALS DESTRUCTOR
Pierre Maurice, Paris, Pierre Girard, Talence, and Pierre Fenaille, Pont-Sainte-Maxence, France, assignors to La Soudure Autogene Francaise
Filed July 12, 1965, Ser. No. 471,062
Claims priority, application France, July 17, 1964, 982,088, Patent 1,412,454
5 Claims. (Cl. 110—8)

ABSTRACT OF THE DISCLOSURE

A metal basket 2 contained in and affixed to a rotating casing 4 which receives viscera to be burned through one of the ends. A burner 16 is directed towards the cavity of the basket. A portion of the very hot gases from the burner passes through the basket to the casing and burns the liquids originating from the viscera and having flowed through the basket.

---

The present invention relates to an incinerator intended for the destruction of organic materials by combustion promoted by putting these materials in contact with very hot gases.

An attempt has been made to burn certain organic materials, such as animal viscera, by placing them on a grill under which a fire has been started. This combustion is very slow and requires a great expenditure of fuel since the viscera stop up the grill and the flame cannot go through them. The case is the same when the fire is set above the viscera or similar wastes.

The incinerator according to the invention does not present these drawbacks. It is characterized by the fact that it comprises a basket arranged in a casing, the basket and casing together turning around a horizontal axis, the casing having the general shape of a cylinder of revolution around said axis and whose bases are provided with annular ends, the opening in one of these bottoms serving for the introduction, into the basket, of the materials to be destroyed and for placing one or more burners, or for the intake of hot gases, the opening in the other end serving for the escape of the fumes resulting from incineration, and the basket presenting the shape of a cylindrical surface with its side wall portions parallel to said horizontal axis.

The advantages of this arrangement will be brought out in the description of an embodiment shown schematically in the attached drawing by way of non-limiting example.

FIGURE 1 is a section along the axis of a part of an incinerator.

FIGURE 2 is a half section along plane II—II of FIGURE 1.

In FIGURE 1, the basket is simply represented by the rectangle 2 in broken lines and by several portions of bars it comprises. This is so as not to obscure the structure in the figure.

The casing comprises mainly a cylindrical plate 4 and two annular ends 6, 8. The plate 4 and ends 6 through which the hot gases come out are provided with an inside refractory lining 10.

To the opening in end 6 is welded an outlet pipe 12 with a grill 14 to restrain heavy particles that are on fire, burning papers, etc. Through the opening in end 8, a loading scoop 18 or a burner 16 can be introduced after removal of the scoop.

Plate 4 carries, by means of flanges such as 24, two rolling guides 20, 22 which are placed on rollers which are not shown. The rotation of the casing around its axis 26, 28 is obtained, for example, by making one of these rollers turn. Axis 26, 28 is horizontal.

Basket 2, which extends almost the entire length of the empty space of the casing, presents the general shape of a cylindrical surface having a polygonal directrix. The form illustrated has a hexagonal base as can be seen in the half section of FIGURE 2, and whose side wall components are parallel to axis 26, 28.

The basket is made up mainly of six grills such as 30, 32, 34 with bars such as 36, 38, 70, which are solid or hollow, welded on crossbars such as 40, 72. The clearance between the ends of the basket and the inside surfaces of the bottom are smaller than shown in FIGURE 1 to reduce to a minimum the escape, in this space, of material to be destroyed.

The long sides of these grills are carried by barrel plate 4 by means of a certain number of supports such as 42, 44. These supports are identical; only the one with reference number 44 will be described.

Foot 46 of the support was welded to barrel plate 4 before installing the refractory lining. After the latter has been put in place and hardened, there is welded to foot 46 a fork of rounded iron bars, made up of a common member 48 and two branches 50 and 52. Each of these branches, after being bent at right angles in the plane of FIGURE 2, ends in a closed or almost closed hook 54, 56, seen edgewise in FIGURE 2.

The grills are threaded on the hooks which are made to pass between their bars. These latter rest on branches 50, 52 and are held by pins such as 58, 60, 74 which have been bent. Thus, an effective attachment of the grills is obtained. The pins are shown very schematically in FIGURE 2.

Burner 16 can be fed with liquid or gas fuel. It is advantageous to direct its flame obliquely, for example, toward the left of FIGURE 2 if the basket and casing turn in the direction of arrow 62; actually, the rotation of the basket drags the materials that are contained therein and form a slope.

The hot gases produced by burner 16 or coming from an outside furnace penetrate the basket and escape through the unobstructed parts of the grill. In the basket, they are in contact with constantly renewed surfaces of organic materials; the liquid portions of these materials have a tendency to pass through the grills, which speeds up drying, then combustion, of the contents of the basket. Between the basket and the casing, these gases heat the basket and lick the inside wall of the casing, a wall on which portions of the materials that have passed through the grill—blood, greases, etc.—have collected. The gases from burning the contents of the basket are added to those of burner 16 to heat the portions carried by the casing.

These modes of action assure the total disappearance of the materials introduced, if they do not contain bones or other noncombustible substance. A post-combustion device can be added in the path of the fumes coming out of pipe 12, to destroy foul smelling gaseous products and the tar particles that are carried along.

The empty space of the casing provided with refractory material can have, for example, a length of 1.45 metres and a diameter of 0.822 metre.

The length of the basket then is 1.43 metres (it has been shortened a little in FIGURE 1 to make it clearer); the points of the hexagonal prism formed by the bars of its grill come to within 25 mm. of the inside cylindrical wall of the refractory lining; the bars are, for example, stainless steel round bars 12 mm. in diameter, 20 mm. distant from axis to axis.

The speed of rotation of the basket and casing is of the order of 15 turns per hour.

Numerous modifications can be made in this incinerator without going outside the scope of the present invention. Some examples are given below:

Bottoms 6, 8 may not be flat but, for example, in the shape of a truncated cone.

Insulation 10 can be eliminated if the quality of the sheets making up the barrel plate and its bottoms give a satisfactory life.

Basket 2 can be of ordinary steel, stainless steel, refractory steel, etc.; the cross section can be circular, square, etc., its wall can be of perforated sheet.

The grills can bear on the supports by their crossbars.

We claim:

1. An incinerator for the destruction of organic materials by combustion promoted by placing these materials in contact with very hot gases, comprising a metal casing, a metal basket within said metal casing, the basket and casing together turning about a generally common horizontal axis, the casing having the general shape of a cylinder of revolution generally around said axis and terminating in annular ends, the opening in one of said ends adapted for the introduction into the basket of materials to be consumed by incineration and for the admission of hot gases into the space inside the basket to provide said incineration, the opening in the other end adapted for the escape of the fumes resulting from said incineration, and the basket presenting the shape of a polygonal cylindrical surface with side wall components generally parallel to said horizontal axis.

2. The incinerator according to claim 1, wherein said basket comprises a plurality of juxtaposed grill panels, each one of said grill panels comprising parallel bars permanently connectedly affixed to cross-bars and being structurally independent from the other grill panels and connectedly affixed to the casing.

3. The incinerator according to claim 2, wherein said grill panels have locking means securing each said grill panel to holding means attached to the interior of said casing.

4. The incinerator according to claim 1, wherein said hot gases are the combustion flames of a combustible fluid, said flames being blown through said one end.

5. The incinerator according to claim 1, wherein said casing has an inner wall of refractory lining extending to said other end, said lining being devoid of non-obturated holes.

References Cited

UNITED STATES PATENTS

| 836,222 | 11/1906 | Smith | 110—18 |
|---|---|---|---|
| 984,646 | 2/1911 | Bois | 110—8 |
| 1,103,956 | 7/1914 | Geden | 110—18 |
| 1,491,894 | 4/1924 | Atkinson | 110—15 |
| 1,929,880 | 10/1933 | Darrah | 110—14 |

FOREIGN PATENTS

| 741,919 | 12/1932 | France. |
|---|---|---|
| 2,407 | 6/1876 | Great Britain. |

FREDERICK L. MATTESON, JR., *Primary Examiner.*

H. B. RAMEY, *Assistant Examiner.*